Nov. 22, 1960 D. L. WALLEN 2,961,495

MAGNETIC TRANSDUCER HEAD

Filed Jan. 28, 1957

INVENTOR.
DAVID L. WALLEN

BY [signature]

ATTORNEY 2,961,495

MAGNETIC TRANSDUCER HEAD

David L. Wallen, Van Nuys, Calif., assignor to General Precision, Inc., Wilmington, Del., a corporation of Delaware Filed Jan. 28, 1957, Ser. No. 636,735

4 Claims. (Cl. 179—100.2)

This invention relates to a new and improved recirculating magnetic transducer head, and more particularly to a magnetic transducer head for use with memory systems such as digital computers which require a very high degree of accuracy.

As is well known in the art, the relative direction of travel between the head and the recording medium, preferably should be such that the gap formed by the pole pieces in the head is at right angles to the movement thereof. Considerations of sizes and other economy, such as space, have taught that overlapped pole pieces give more desirable results under certain conditions than do the so-called butted heads. However, certain inherent objectionable characteristics have been found to exist in these overlapped pole pieces.

For example, it has been found that transducers using overlapped pole pieces of conventional design are objectionable because they have extremely high loss of efficiency due to magnetic flux by-pass. By magnetic flux by-pass is meant that magnetic flux which flows between the pole pieces other than in the area desired. Theoretically in read-record heads for the memory system of a digital computer, the optimum efficiency for the head would be attained if the entire flux flow between the pole pieces took place only between those areas on the pole piece immediately adjacent the usable recording medium, and at no other.

One object of this invention is to overcome this difficulty by providing a magnetic transducer head in which magnetic flux by-pass is reduced to a minimum.

Briefly described, the object of this invention is accomplished by forming the pole-pieces on the inner periphery thereof at the plane of contact in such a manner that a cavity or spacing is provided between the surfaces of the pole pieces in this area which is greater than the gap between the pole pieces adjacent the recording medium and the flux by-pass in this area is reduced to a minimum.

Other objects and advantages of this invention will become apparent as the discussion proceeds, and are taken in connection with the accompanying claims and drawings, in which;

Figure 1:
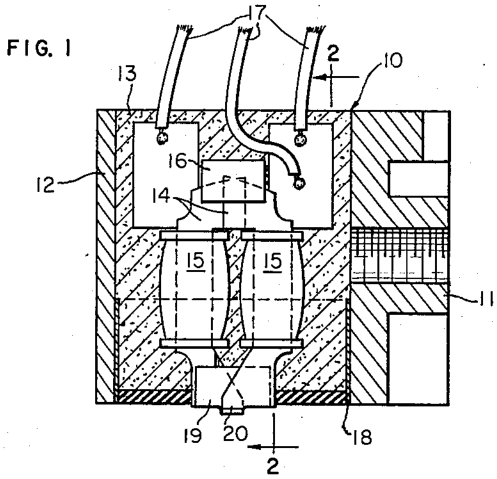
Figure 1 is a sectional view showing an assembled head embodying my invention.
Figure 2:
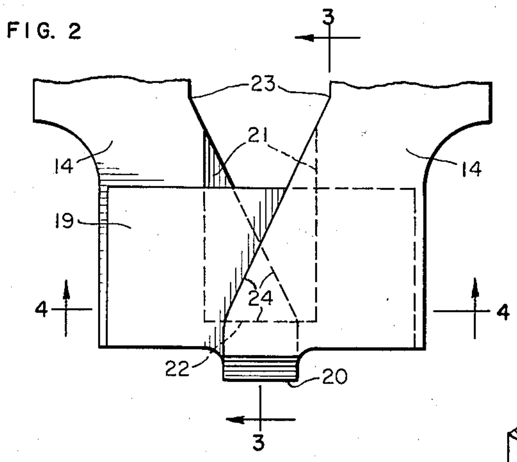
Figure 2 is an enlarged plan view showing the cores of a read record head embodying my invention, illustrating how the overlapped faces of the cores are formed.
Figure 3:
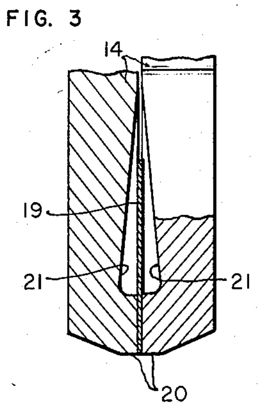
Figure 3 is a cross sectional view of Figure 3 taken along the line 3—3 of Figure 2.
Figure 4:
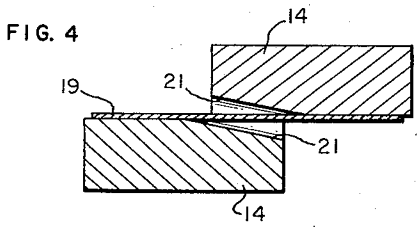
Figure 4 is a cross sectional view taken along the line 4—4 of Figure 2.

Turning now to a detailed description of the figures, the numeral 10, in Figure 1, designates generally a read-record head embodying my invention. The numeral 11 designates a suitable non-magnetic supporting member which forms no part of this invention, which consists of a housing or support member 12 which completely surrounds the head. The numeral 13 designates a suitable hardenable non-magnetic castable material which is for the purpose of supporting the head in the housing. Imbedded in the hardenable non-magnetic castable material 13 is a pair of cores 14, each provided with a signal winding 15 wound around and intermediate the ends thereof. The cores 14 are positioned in overlapping relationship, as shown in Figures 1, 2 and 3, at both ends thereof, and are held together by means of a clamp 16 of a strength sufficient to tightly hold the cores 14 together until after the castable material 13 has completely hardened. Electrical connections to the wires making up the signal windings 15 are designated by the numeral 17 and are of conventional design and applied by conventional practices forming no part of this invention.

Figure 5:
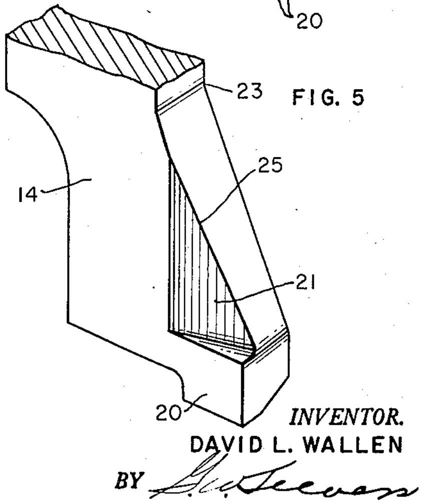
Figure 5 is an enlarged perspective view of one of the cores at the head.

Surrounding the lower portion of the cores 14 and the signal winding 15 is a magnetic shielding material 18. Spaced between the cores 14 is a shim 19 preferably made of silver, or other non-magnetic material shown in Figures 1, 2 and 3. The pole pieces 20 of the cores 14 are shaped as shown in Figures 2, 3 and 5. The use of the shielding material 18 and shim 19, and the shaping of the pole pieces 20 are features which also contribute to the optimum concentration of the flux path.

As shown in Figures 2 to 5, inclusive, each of the cores 14 in the area of overlap adjacent the pole pieces 20 is provided with a cutaway or cavity portion 21. As shown in Figures 2 and 5, the cavity 21 on each of the pole pieces 14 reduces each of the pole pieces in thickness along the inner periphery of the assembled cores and extends along each of the cores 14 from a line 22 representing the beginning of the maximum overlap of the cores to a point appreciably above the top line of the shielding shim 19, but does not extend to the break 23 in the cores. As further shown more clearly in Figure 5, the reduced portion of each of the cores 14 is sloped or bevelled so that the cavity is of its maximum width under the area of overlap 24 shown in Figure 2. The distance of the resulting separation is greater than twice the width of the gap between the pole pieces 20. For a clearer understanding of the important dimensions of this cavity and of the reduced portions 21, reference is made to Figure 2 wherein it can be seen that the lines of overlap 24 form a triangle.

However, it is to be understood that the specific dimensions of the reduced portion 21 are not critical and are dependent to a large extent upon the strength of the material of the cores 14, the shape and the thickness thereof. In practice, theoretically, it is desirable that the cores along the line 25 be spaced as far apart as practicable without weakening the structure of the cores. It is also important that the depth of the reduced portion 21 never extends into the core such a distance so as to reduce the cross sectional area of the core at any point to such an extent that this cross sectional area is less than the cross sectional area of the pole piece 20 at its extremity, or face, which lies adjacent the recording medium. Obviously, changes in shape of the cores 14 would necessitate changes in shape and depth of the reduced portion 21.

A better understanding of the preferred dimensions of the reduced portion or cavity 21 will be understood when the purpose to be accomplished by this particular formation is more clearly understood. In heads of this type it is desirable to induce the maximum amount of magnetic flux in the pole pieces 20. Inherently there will be an undesired leakage of magnetic flux between the cores 14 along their inner periphery at all points, increasing as the surfaces of the cores approach each other, it being desirable to concentrate this flow of flux between the cores across the gap between the cores at the face of the pole pieces 20. Therefore, it is desirable to reduce to a minimum the flow of flux between the core at all other points in the ends of the core adjacent the recording medium. It has been found that there is an extremely high so-called "shorting" of magnetic flux between the cores at their inner periphery. The flow of magnetic flux between two poles is approximately, depending upon the type of core material used, and other conditions, decreased to the fourth power as the distance increases. Therefore, by increasing the distance between the cores along their line of overlap at the inner periphery to a distance greater than the gap between the pole pieces at the point where the flux is desired to flow, the shorting flux, as it is chosen to be called here, will be reduced as to the fourth power approximately in relation to the distance these surfaces are separated. Thus, it is desired to separate the cores at their line of contact on the inner periphery as far as practicable, as set forth in detail above, within the limits permitted by the strength of the material in the cores and still provide a cross-sectional area through the cores at the reduced portion greater than the cross-sectional area of the cores at the surface where the flux is to be used. It is to be understood that the reason for this particular limitation is that if the cores are reduced beyond this point there will be a choking effect of the magnetic flux as it flows through the cores, with a resulting undesirable reduction in the flux intensity flowing to the pole piece 20. On the other hand the maximum width of the cavity preferably should be at least twice the width of the gap between the pole pieces.

Having thus described my invention, it is to be understood that changes in shape, size, material and the like, can be resorted to without departing from the spirit of my invention, which is set forth in the appended claims.

I claim:

1. A magnetic transducer head comprising a core having two substantially parallel spaced legs magnetically coupled at one end thereof, said legs having enlarged overlapping portions at the other end thereof with oblique inner surfaces terminating in opposed pole pieces, a thin shim of non-magnetic material snugly fitted between said pole pieces and covering at least the overlapping adjacent surfaces of said legs, the contiguous corners of said oblique overlapping portions being bevelled from a point inwardly of the overlapping portion out to said pole pieces to provide a cavity with substantially parallel opposed faces between the overlapping portions of said legs inwardly from said pole pieces, said cavity being at least twice the width of said shim extending therethrough.

2. A magnetic transducer head comprising a core having two C shaped elements with substantially parallel spaced legs and overlapping portions magnetically coupled at one end thereof, said legs having enlarged overlapping portions at the other end thereof with oblique inner surfaces terminating in opposed pole pieces, a thin shim of non-magnetic material snugly fitted between said pole pieces and covering at least the overlapping adjacent surfaces of said legs, the contiguous corners of said oblique overlapping portions being bevelled from a point inwardly of the overlapping portion out to said pole pieces to provide a cavity with substantially parallel opposed faces between the overlapping portions of said legs inwardly from said pole pieces, said cavity being at least twice the width of said shim extending therethrough.

3. A magnetic transducer head comprising a core having two substantially parallel spaced legs magnetically coupled at one end thereof, said legs having enlarged overlapping portions at the other end thereof with oblique inner surfaces terminating in opposed pole pieces, said pole pieces tapering outwardly beyond the body of said core, a thin shim of non-magnetic material snugly fitted between said pole pieces and covering at least the overlapping adjacent surfaces of said legs, the contiguous corners of said oblique overlapping portions being bevelled from a point inwardly of the overlapping portion out to said pole pieces to provide a cavity with substantially parallel opposed faces between the overlapping portions of said legs inwardly from said pole pieces, said cavity being at least twice the width of said shim extending therethrough.

4. A magnetic transducer head comprising a core having two substantially parallel spaced legs magnetically coupled at one end thereof, said legs having enlarged overlapping portions at the other end thereof with oblique inner surfaces terminating in opposed pole pieces, a thin shim of non-magnetic material snugly fitted between said pole pieces and covering at least the adjacent overlapping surfaces of said legs, the contiguous corners of said oblique overlapping portions being bevelled from a point inwardly of the overlapping portion out to said pole pieces to provide a cavity with substantially parallel opposed faces between the overlapping portions of said legs inwardly from said pole pieces, said cavity being at least twice the width of said shim extending therethrough, said pole pieces extending only across a small portion of said head and having bevelled lower surfaces extending outwardly beyond the ends of said legs to concentrate the flux path in a small area in a recording medium positioned adjacent the ends of said pole pieces.

References Cited in the file of this patent

UNITED STATES PATENTS

| | | |
|---|---|---|
| 2,596,912 | Nygaard | May 13, 1952 |
| 2,628,284 | Friend | Feb. 10, 1953 |
| 2,786,897 | Schwarz | Mar. 26, 1957 |
| 2,852,617 | Thiele | Sept. 16, 1958 |